United States Patent
Li et al.

(10) Patent No.: US 12,001,427 B2
(45) Date of Patent: Jun. 4, 2024

(54) SYSTEMS, METHODS, AND DEVICES FOR ACCELERATION OF MERGE JOIN OPERATIONS

(71) Applicant: Samsung Electronics Co., Ltd., Suwon-si (KR)

(72) Inventors: Shiyu Li, Durham, NC (US); Yiqun Zhang, Sunnyvale, CA (US); Joo Hwan Lee, San Jose, CA (US); Yang Seok Ki, Palo Alto, CA (US); Andrew Chang, Los Altos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/174,350

(22) Filed: Feb. 11, 2021

(65) Prior Publication Data
US 2022/0207040 A1   Jun. 30, 2022

Related U.S. Application Data

(60) Provisional application No. 63/131,307, filed on Dec. 28, 2020.

(51) Int. Cl.
*G06F 16/2453* (2019.01)
(52) U.S. Cl.
CPC .. *G06F 16/24537* (2019.01); *G06F 16/24532* (2019.01)
(58) Field of Classification Search
CPC ............ G06F 16/24532; G06F 16/24537
See application file for complete search history.

(56) References Cited

U.S. PATENT DOCUMENTS

| | | | |
|---|---|---|---|
| 6,732,228 B1* | 5/2004 | Willardson | G11C 15/00 711/108 |
| 8,244,718 B2 | 8/2012 | Chamdani et al. | |
| 8,805,850 B2 | 8/2014 | Sukhwani et al. | |
| 8,825,678 B2 | 9/2014 | Potapov et al. | |

(Continued)

OTHER PUBLICATIONS

Casper, Jared et al., "Hardware acceleration of database operations", FPGA '14: Proceedings of the 2014 ACM/SIGDA international symposium on Field-programmable gate arrays, Feb. 2014, pp. 151-160.

(Continued)

*Primary Examiner* — Robert W Beausoliel, Jr.
*Assistant Examiner* — Nirav K Khakhar
(74) *Attorney, Agent, or Firm* — Renaissance IP Law Group LLP (57) ABSTRACT

A method of processing data may include receiving a stream of first keys associated with first data, receiving a stream of second keys associated with second data, comparing, in parallel, a batch of the first keys and a batch of the second keys, collecting one or more results from the comparing, and gathering one or more results from the collecting. The collecting may include reducing an index matrix and a mask matrix. Gathering one or more results may include storing, in a leftover vector, at least a portion of the one or more results from the collecting. Gathering one or more results further may include combining at least a portion of the leftover vector from a first cycle with at least a portion of the one or more results from the collecting from a second cycle.

20 Claims, 9 Drawing Sheets

Table 1
(Left Table)

(1, r1)
(3, r3)
(5, r5)
(6, r6)

Table 2
(Right Table)

(3, R3)
(4, R4)
(6, R6)
(8, R8)
⋮

Table 3
(Joined Table)

(3, r3, R3)
(6, r6, R6)
⋮

(56) References Cited

U.S. PATENT DOCUMENTS

| | | | |
|---|---|---|---|
| 9,674,249 B1* | 6/2017 | Kekre | G06F 16/24568 |
| 9,811,548 B2 | 11/2017 | Stigsen et al. | |
| 10,042,876 B2 | 8/2018 | Derby et al. | |
| 10,127,275 B2 | 11/2018 | Asaad et al. | |
| 10,198,469 B1* | 2/2019 | Wright | G06F 16/235 |
| 2013/0226909 A1* | 8/2013 | Katsunuma | G06F 16/24568 |
| | | | 707/722 |
| 2016/0092517 A1* | 3/2016 | Viel | G06F 16/24568 |
| | | | 707/770 |
| 2018/0089266 A1 | 3/2018 | Vujic et al. | |
| 2022/0043787 A1* | 2/2022 | Kondiles | G06F 16/215 |
| 2022/0138168 A1* | 5/2022 | Veselova | G06F 16/215 |
| | | | 707/692 |

OTHER PUBLICATIONS

Chen, Ren et al., "Accelerating Equi-Join on a CPU-FPGA Heterogeneous Platform", 2016 IEEE 24th Annual International Symposium on Field-Programmable Custom Computing Machines (FCCM), May 1-3, 2016.

Papaphilippou, Philippos et al., "Accelerating the Merge Phase of Sort-Merge Join", 2019 29th International Conference on Field Programmable Logic and Applications (FPL), Sep. 8-12, 2019.

Wu, Lisa et al., "Navigating Big Data with High-Throughput, Energy-Efficient Data Partitioning", ISCA '13: Proceedings of the 40th Annual International Symposium on Computer Architecture, Jun. 2013, pp. 249-260.

* cited by examiner

SYSTEMS, METHODS, AND DEVICES FOR ACCELERATION OF MERGE JOIN OPERATIONS

CROSS-REFERENCE TO RELATED APPLICATIONS

This application claims priority to, and the benefit of, U.S. Provisional Patent Application Ser. No. 63/131,307 titled "Systems, Methods, and Devices for Near-Storage Merge Join Acceleration" filed Dec. 28, 2020 which is incorporated by reference.

TECHNICAL FIELD

This disclosure relates generally to data processing, and more specifically to acceleration of merge join operations.

BACKGROUND

Data processing systems may implement acceleration schemes to improve the performance of data processing operations such as merge join.

The above information disclosed in this Background section is only for enhancement of understanding of the background of the invention and therefore it may contain information that does not constitute prior art.

SUMMARY

A method of processing data may include receiving a stream of first keys associated with first data, receiving a stream of second keys associated with second data, comparing, in parallel, a batch of the first keys and a batch of the second keys, collecting one or more results from the comparing, and gathering one or more results from the collecting. The comparing may include generating at least one matrix based on the batch of the first keys and the batch of the second keys. The collecting may include reducing the at least one matrix. The at least one matrix may include an index matrix and a mask matrix, and reducing the at least one matrix may include reducing the index matrix to an index vector, and reducing the mask matrix to a mask vector. The method may further include generating an offset vector based on the mask vector. Collecting one or more results may include generating a result vector based on an offset and a corresponding one of the first keys. Gathering one or more results may include storing, in a leftover vector, at least a portion of the one or more results from the collecting. Gathering one or more results further may include combining at least a portion of the leftover vector from a first cycle with at least a portion of the one or more results from the collecting from a second cycle. The first data may include indices to rows associated with corresponding ones of the first keys. The comparing, collecting, and gathering perform a merge join operation.

An apparatus may include a merge core including a parallel comparison circuit configured to receive a stream of first keys associated with first data, receive a stream of second keys associated with second data, and compare, in parallel, a batch of the first keys and a batch of the second keys, a collection circuit configured to collect one or more results from the parallel comparison circuit, and a gathering circuit configured to gather one or more results from the collection circuit. The apparatus may further include a first reader configured to read the stream of first keys from a memory, and a second reader configured to read the stream of second keys from the memory. The first reader may be further configured to read a stream of the first data from the memory, and the second reader may be further configured to read a stream of the second data from memory. The apparatus may further include a writer configured to write a stream of output keys from the gathering circuit to the memory. The first reader may be further configured to read a stream of the first data from the memory, the second reader may be further configured to read a stream of the second data from memory; and the writer may be further configured to write a stream of output data associated with the stream of output keys from the gathering circuit to the memory. The parallel comparison circuit, the collection circuit, and the gathering circuit may be integral with an accelerator device. The accelerator device may include a field programmable gate array.

A system may include a storage device, a memory configured to receive a dataset from the storage device, and an accelerator device coupled to the storage device, wherein the accelerator device may include a parallel comparison circuit configured to receive a stream of first keys associated with first data of the dataset from the memory, receive a stream of second keys associated with second data of the dataset from the memory, and compare, in parallel, a batch of the first keys and a batch of the second keys, a collection circuit configured to collect one or more results from the parallel comparison circuit, and a gathering circuit configured to gather one or more results from the collection circuit. The system may further include a point-to-point connection between the storage device and the accelerator device. The memory and the accelerator device may be integral with the storage device.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Overview

Some of the principles of this disclosure relate to parallel processing techniques that may accelerate merge join and/or other operations. For example, some embodiments may implement a parallel comparison scheme with result collection and/or output gathering operations. Depending on the implementation details, this may improve scalability, increase compute efficiency (e.g., throughput), increase energy efficiency, reduce data dependency issues, and/or the like.

Some embodiments may transform key level parallelism to concurrent data structures that may be especially suitable for hardware acceleration. For example, in some embodiments, scalability may be improved by organizing input data into batches that may be configured to fit different memory bandwidth and/or processing resources. Thus, some embodiments may be configured with different levels of parallelism.

In some embodiments, a parallel comparison, result collection, and output gathering architecture may be arranged in a pipelined configuration in which comparisons between a pair of batches may be completed in a single clock cycle. Thus, depending on the implementation details, a new pair of batches may be processed each cycle, thereby improving throughput.

In some embodiments, results generated by a parallel comparison, result collection, and output gathering architecture may be used directly by a subsequent operation without additional processing steps. Depending on the implementation details, this may further improve scalability. Moreover, in some embodiments, a gathering operation may pack results densely, for example, using a buffering operation which, in some implementations, may reduce or eliminate data dependency issues.

Some embodiments may use point-to-point (P2P) communications between a storage device and an accelerator device that may implement a parallel comparison, result collection, and output gathering architecture. For example, in some embodiments, an accelerator device and a storage device may be located on a board, module, and/or the like with a storage device, with a P2P interconnect therebetween. In some embodiments, a parallel comparison, result collection, and output gathering architecture may be implemented on an accelerator device in a computational storage device. Depending on the implementation details, these configurations may reduce or eliminate both the host CPU involvement, and/or data movement between storage, host memory, and/or the device memory associated with the accelerator device.

The principles disclosed herein have independent utility and may be embodied individually, and not every embodiment may utilize every principle. However, the principles may also be embodied in various combinations, some of which may amplify the benefits of the individual principles in a synergistic manner.

Merge Join Operations

Figure 1:
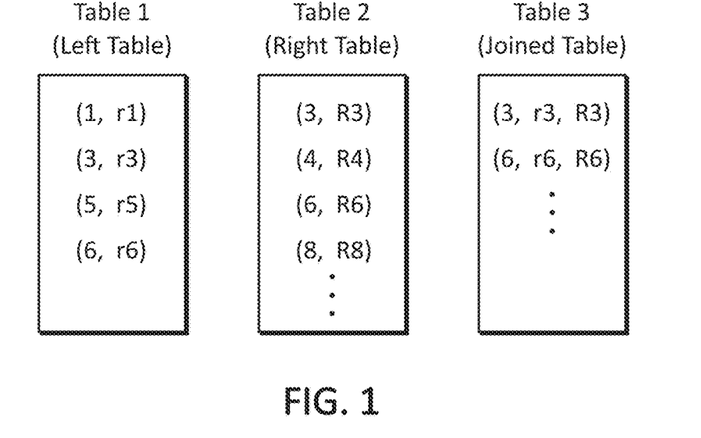
FIG. 1 illustrates an example embodiment of a join operation that may be implemented according to this disclosure.

FIG. 1 illustrates an example embodiment of a join operation that may be implemented according to this disclosure. In the embodiment illustrated in FIG. 1, a first table, which may be referred to as a left table, may be combined in a join operation with a second table, which may be referred to as a right table, to generate a third table, which may be referred to as a joined table. In some embodiments, the left and right tables may include data arranged in rows and columns. A column in each table may be selected as a join key, and data in different rows of the left and right tables with matching join keys may be combined into a single row in the joined table. For example, in the embodiment illustrated in FIG. 1, the columns with only numbers in the left and right tables may be selected as the join key. Because the join key (3) in the second row from the top in the left table matches the join key (3) in the top row of the right table, the data in the second row from the top in the left table (3, r3) and the data in the top row of the right table (3, R3) may be combined in a single row (3, r3, R3) and placed in the joined table. Similarly, the rows having the matching join key (6) may be combined into a single row (6, r6, R6) and placed in the joined table.

In some embodiments, data from the rows in the left and right tables that have no matching keys in the other table may be omitted from the joined table as illustrated in FIG. 1, in which case, the join operation may be referred to as an inner join. The principles of this disclosure, however, may be applied to other types of join operations such as various types of outer joins.

In some embodiments, the join keys such as 1, 3, 4, 5, 6, and 8 may be actual data, whereas the data such as r3, R3, r6, R6, and/or the like in the left and/or right tables may be indices to data rather than the data itself. Thus, in some embodiments, the left and/or right tables may be implemented as index tables in which the data such as r3, R3, r6, R6 may point to actual data and/or rows of actual data, in other tables.

To locate the rows with matching keys, a join operation may be implemented as a sort-merge join (which may also be referred to as a merge join operation). In a sort-merge join operation, the left and right tables may first be sorted to arrange the keys in sequential order such as increasing or decreasing numerical order. This may simplify and/or speed up the merging of the tables which may progress by comparing the join keys. A sort-merge join operation may be beneficial for applications in which both data tables are relatively large. In some embodiments, with partitioning and shuffling, a sort-merge join operation can be performed by multiple nodes in parallel.

A merge join operation may be memory intensive. For example, in some database benchmarks, a CPU may spend almost fifty percent of its execution time in join operations. Moreover, data for merge join operations may be processed in a streaming fashion, and a CPU performing a merge join may be unable to utilize the full bandwidth of a memory interface. For example, in some embodiments, a general purpose CPU may be able to process a merge join operation at a rate that corresponds to a bandwidth up to 5 GB/s, but the CPU may have a memory interface that is capable of transferring data at 100 GB/s. Thus, a CPU-based merge join operation may waste memory bandwidth. Additionally, a CPU implementation of a merge join operation also may be inefficient because a CPU's cache hierarchy may introduce additional latency. Furthermore, a merge join operation may flush a cache which may affect the performance of other applications.

In some embodiments, hardware acceleration may be used to improve the performance of a merge join operation. For example, in some embodiments, a host CPU may offload a sorting operation to a hardware accelerator. However, the host CPU may stay involved in the sort-merge join operation which may limit the benefit of hardware acceleration. Moreover, this type of implementation may also involve transferring large amounts of data between storage and host memory and between host memory and accelerator memory. This may introduce delays, increase energy consumption, and/or the like.

In some embodiments, a hardware accelerator architecture for a merge join operation may compare multiple records in parallel. However, this may involve a direct comparison between input pairs which may limit the scalability of the architecture. In other embodiments, a parallel merge join scheme based on a merger may involve co-grouping and/or abstracting schemes may involve additional processing to obtain a complete result that may be used by a subsequent operation. Thus, in some embodiments, overhead associated with processing results may become dominant when attempting to scale the accelerator architecture. These architectures may also involve host CPU operations and/or transferring data between storage, host memory, and accelerator memory. Moreover, these architectures may tightly couple a sort operation with a merge join operation which may sacrifice flexibility to take advantage of other resources such as sort operations which may have already been performed in a query pipeline.

Core Architecture

Figure 2:
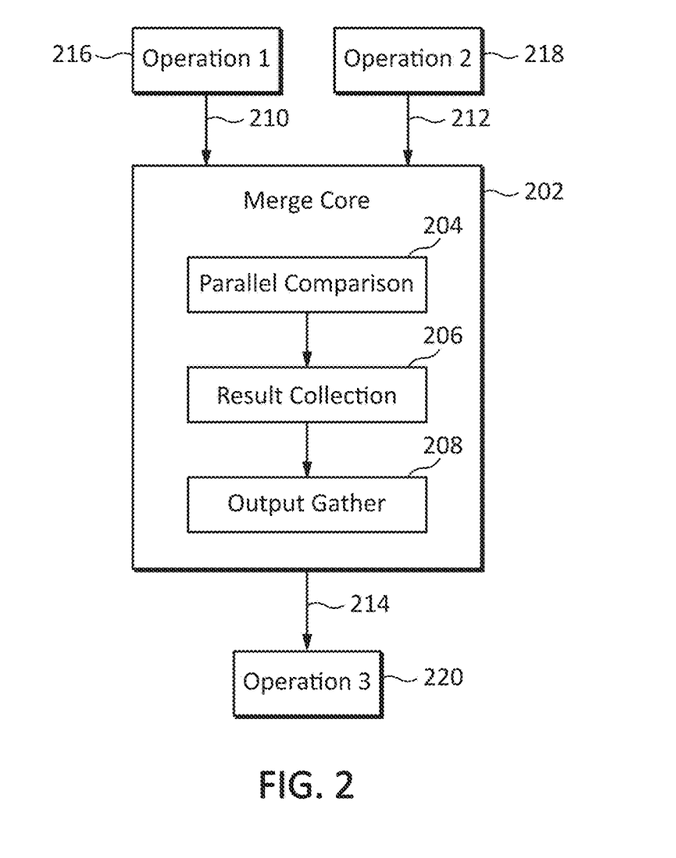
FIG. 2 illustrates an embodiment of a merge core architecture according to this disclosure.

FIG. 2 illustrates an embodiment of a merge core architecture according to this disclosure. The embodiment illustrated in FIG. 2 may have a merge core 202, which may include a parallel comparison circuit 204, a result collection circuit 206, and an output gather circuit 208. The merge core 202 may receive a first input stream 210 and a second input stream 212 from a first operation 216 and a second operation 218, respectively. The merge core 202 may output a third stream 214 to a third operation 220.

The first stream 210 and second stream 212 may each include, for example, join keys and data for a join operation for a left table and a right table, respectively, and the third stream 214 may include the resulting join keys and data output from the join operation, for example, for a joined table. In some embodiments, the keys and/or data in the first stream 210, the second stream 212, and/or the third stream 214 may be implemented as indices.

In some embodiments, the parallel comparison circuit 204 may load pairs of keys from the first stream 210 and the second stream 212 into corresponding registers and perform a parallel comparison operation to generate one or more result matrices such as an index matrix and/or a mask matrix. The result collection circuit 206 may reduce the one or more matrices to one or more vectors such as an index vector and/or a mask vector. The result collection circuit 206 may then collect results and place them in a result vector. For example, in some embodiments, the result collection circuit 206 may generate an offset vector from a mask vector and then collect the corresponding elements for the result vector based on the offset vector and the index vector. The output gather circuit 208 may organize the contents of one or more result vectors to pack them into one or more output vectors which may be output through the third stream 214 for use by the third operation 220. In some embodiments, the output gather circuit 208 may implement a buffering scheme, for example, to gather results from multiple cycles, and pack them more tightly into dense vectors.

The first operation 216 and the second operation 218 may be implemented, for example, as read operations from memory, sort operations, filter operations, and/or the like. The third operation 220 may be implemented as a write operation to memory, a sort operation, a filter operation, and/or the like. For example, in some embodiments, the merge core 202 may operate as a standalone kernel that may read left and right tables from memory, perform a merge join operation, and write the results to memory. As another example, in some other embodiments, the merge core 202 may operate as a stage in a query pipeline in which the merge core 202 is connected to one or more other kernels through one or more streaming interface for the first stream 210, the second stream 212, and/or the third stream 214.

Depending on the implementation details, the embodiment illustrated in FIG. 2 may provide design flexibility, for example, to improve memory bandwidth utilization in various database applications. The embodiment illustrated in FIG. 2 may also be configured with different levels of parallelism which may improve scalability. Additionally, the embodiment illustrated in FIG. 2 may be implemented in a pipeline configuration (e.g., a fully pipelined architecture) which may improve resource utilization and/or throughput. Moreover, the output gather circuit 208 and/or other elements or the embodiment illustrated in FIG. 2 may generate output results that may be used directly by successive operations which may improve scalability and/or reduce dependency issues.

The embodiment illustrated in FIG. 2, as well as any of the methods, techniques, processes, and/or the like described herein may be implemented with hardware, software, or any combination thereof. For example, in some embodiments, any of the operations may be implemented with combinational logic, sequential logic, one or more timers, counters, registers, state machines, volatile memories such as dynamic random access memory (DRAM) and/or static random access memory (SHAM), nonvolatile memory such as flash memory, complex programmable logic devices (CPLDs), field programmable gate arrays (FPGAs), application specific integrated circuits (ASICs), complex instruction set computer (CISC) processors and/or reduced instruction set computer (RISC) processors, and/or the like executing instructions, and/or the like, as well as graphics processing units (GPUs), neural processing units (NPUs), and/or the like.

The operations and/or components described with respect to the embodiment illustrated in FIGS. 2, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components may be illustrated as individual components, in some embodiments, some components shown separately may be integrated into single components, and/or some components shown as single components may be implemented with multiple components.

Data Dependency

Figure 3:
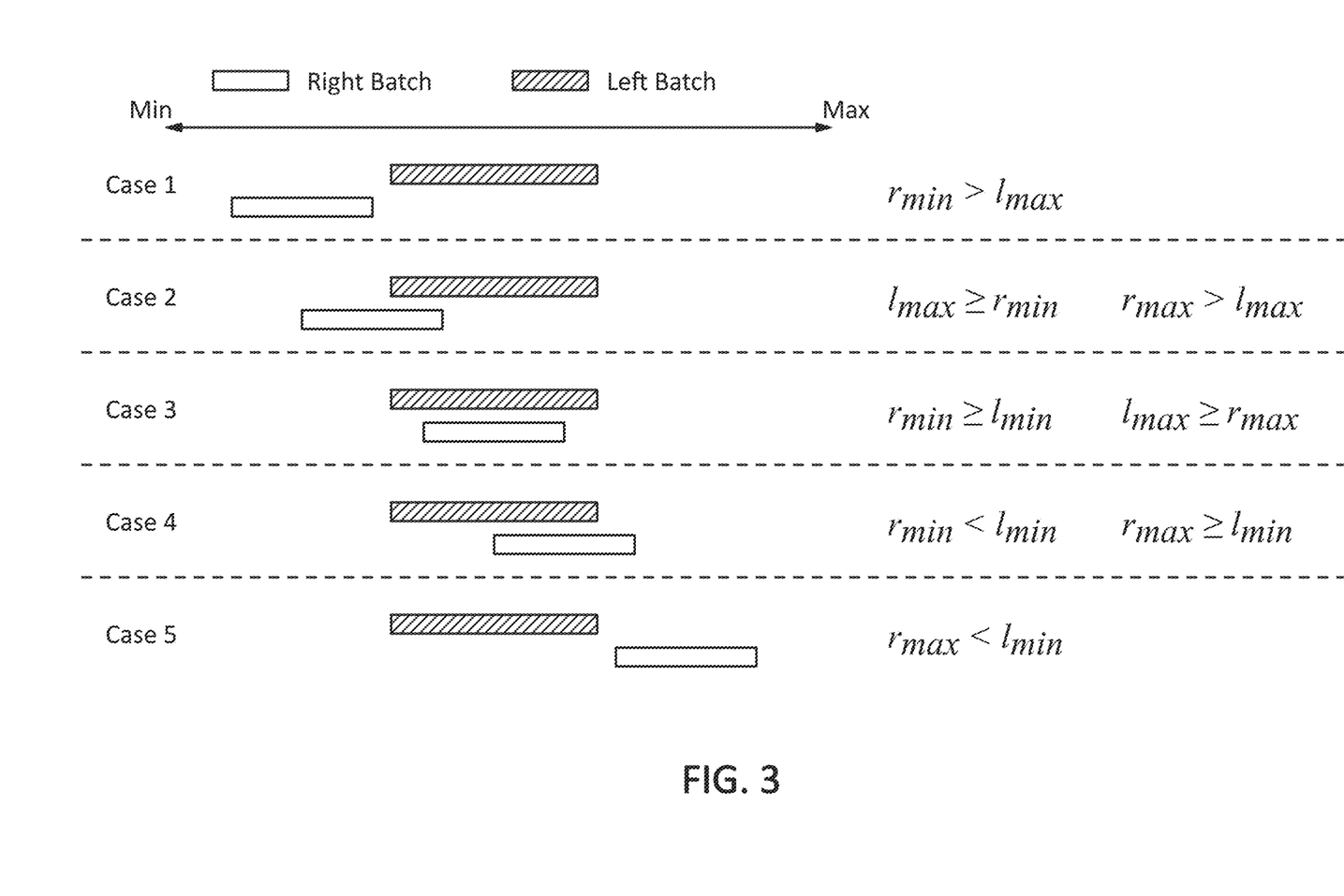
FIG. 3 illustrates some possible data dependency cases that may occur in an embodiment of a merge join operation according to this disclosure.

FIG. 3 illustrates some possible data dependency cases that may occur in an embodiment of a merge join operation according to this disclosure. In each of the cases illustrated in FIG. 3, the bars with hatching may indicate the ranges of the left batch of join keys, and the unhatched bars may indicate the ranges of the right batch of join keys. In the relationships on the right of FIG. 3, $l_{min}$ and $l_{max}$ may refer to the minimum and maximum values of the left keys, and $r_{min}$ and $r_{max}$ may refer to the minimum and maximum values of the right keys. When loading the next batches of left and right keys, some embodiments may attempt to load the batches such that one or both of two conditions are satisfied: (1) there is overlap between the ranges of the left keys and the ranges of the right keys; and (2) each element in the current batch has been compared within the corresponding range before loading the next batch. If condition (1) is not satisfied, there may be no matching keys between the left and right batches of keys, and thus, comparison cycles may be wasted. If condition (2) is not satisfied, one or more output results may be missed.

The following analysis may assume that the batch loading stage occurs at the head of a comparison loop, and the current batches have been compared. It may also assume that the left table has unique keys (that is, no duplicate keys). For case 1 and case 5, condition (1) may not be satisfied, and thus, comparison cycles may be wasted because there may be no matched keys in the left and right batches of data. Thus, some embodiments may continue loading the successive next batches of right data until there is some overlap between the keys in the left and right batches (e.g., not case 1 or case 5). For case 2, elements larger than $l_{max}$ may not be compared within the proper range, thus the next left batch may be loaded. For case 3 and case 4, all of the right batch elements may have been properly compared and thus, the next right batch may be loaded. Because there may be duplicate keys in the right table, the maximum element may appear in the next right batch. Thus, for case 3, even when both maximum and minimum values are equal, in some embodiments, the next right batch may be loaded.

Pipelined Operations

In some embodiments, one or both of the input data tables may only have unique keys, (that is, no duplicate keys). For consistency and convenience in this description, the left table may be assumed to have only unique keys, and the right table may or may not have duplicate keys.

Figure 4:
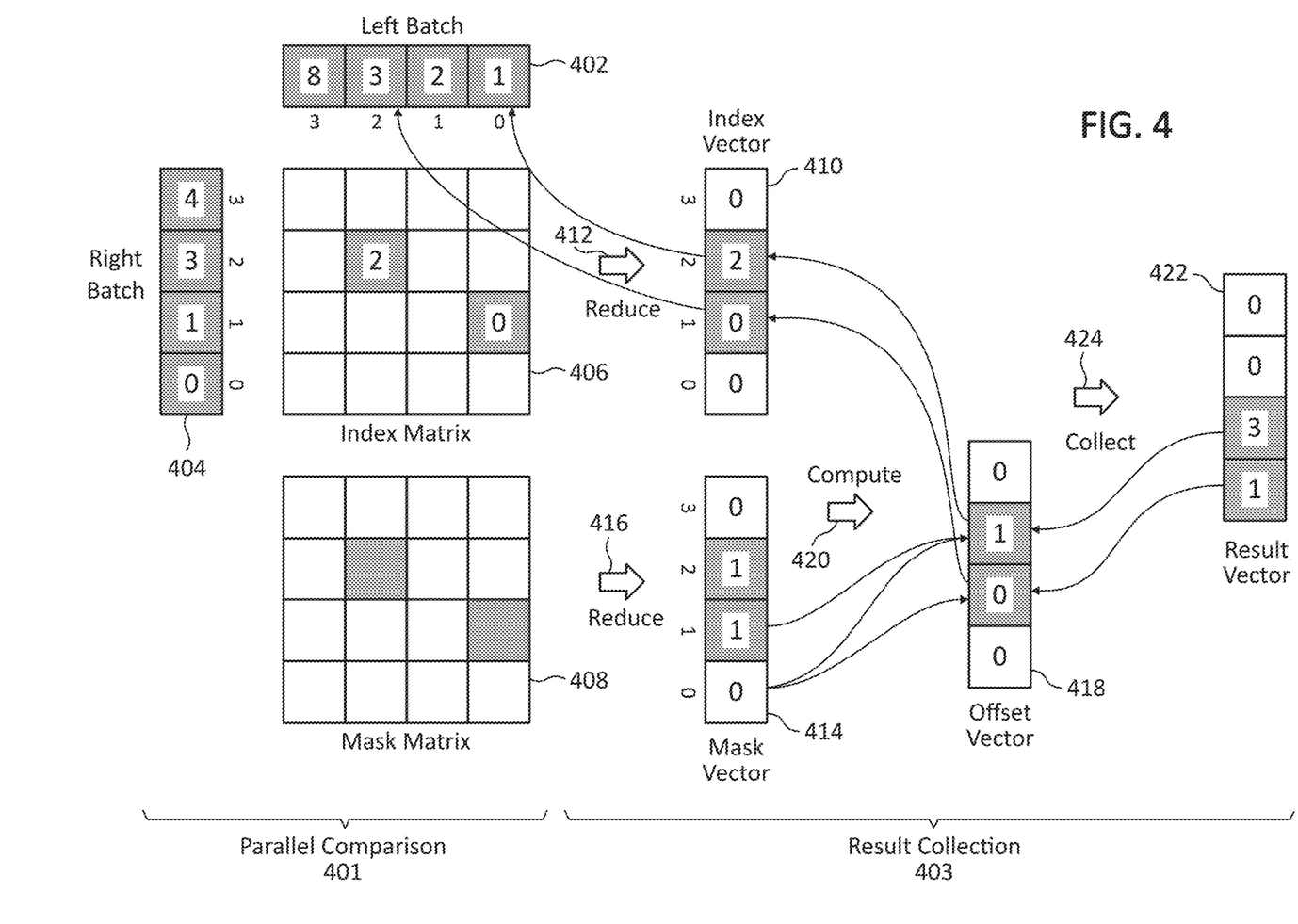
FIG. 4 illustrates an example embodiment of a fully pipelined parallel comparison and result collection operation according to this disclosure.

FIG. 4 illustrates an example embodiment of a fully pipelined parallel comparison and result collection operation according to this disclosure. The embodiment illustrated in FIG. 4 may be implemented, for example, with the embodiment illustrated in FIG. 2. Although the example embodiment illustrated FIG. 4 may be fully pipelined, other embodiments according to this disclosure may be implemented without full pipelining.

Referring to FIG. 4, at the beginning of a comparison cycle, a batch of left keys may be loaded into a left batch register 402. In this example, the values of the left keys may be 1, 2, 3, and 8 in register positions 0, 1, 2, and 3, respectively. A batch of right keys may be loaded into the right batch register 404. In this example, the values of the right keys may be 0, 1, 3, and 4, in register positions 0, 1, 2, and 3, respectively. In the matrices and vectors illustrated in FIG. 4, valid data may be indicated by shaded cells, and invalid data, which may also be referred to as null data, may be indicated by unshaded cells.

A parallel matrix comparison operation 401 may be performed on the left and right batches of data by comparing each element in the right batch with each element in the left batch to generate an index matrix 406 and a mask matrix 408. In the index matrix 406, which may also be referred to as a two-dimensional array, each valid element may contain the index of the left key that matches the corresponding right key. In the mask matrix 408, which may also be referred to as a two-dimensional array, each valid element may indicate that the current pair of left and right keys match.

A result collection operation 403 may then generate an index vector 410 as shown by arrow 412 by reducing the index matrix 406 along the left table dimension. For example, in some embodiments, the index matrix 406 may be reduced along the left table dimension (row dimension) by computing the sum of the indices in each row, wherein each invalid or null element may be treated as a zero.

The result collection operation may also generate a mask vector 414 as shown by arrow 416 by reducing the mask matrix 408 along the left table dimension. For example, in some embodiments, the mask matrix 408 may be reduced along the left table dimension (row dimension) by performing a logic OR-reduce in which valid elements are treated as ones and invalid or null elements are treated as zeros.

Because the left table may only have unique keys, for each right table key, there may be at most one matching key in the left table, and therefore, the reduction operation may not corrupt the results. Thus, there may only be only one valid index in each row of the index matrix 406 and therefore one valid index in each position of the index vector 410. Likewise, there may only be one valid element in each row of the mask matrix 408 and therefore one valid entry in each position of the mask vector 414.

The result collection operation 403 may then generate an offset vector 418 from the mask vector 414 as shown by arrow 420. In some embodiments, each position in the offset vector 418 may represent the corresponding position in a result vector 422 that the key for the corresponding position of the mask vector 414 may be written to. In some embodiments, the offset for each position of the offset vector 418 may be calculated by counting the number of valid elements from the left batch, beginning with the lowest index, and not including itself.

The result collection operation 403 may then collect the results and place them in the result vector 422. In some embodiments, the result collection operation 403 may cycle through the positions of the result vector 422. The left key (and associated data) may be obtained by (a) finding the index of the element in the offset vector whose value equals the current index of the output vector, and (b) fetching the left index based on the offset vector index. The index of the right table may the index of the corresponding offset vector element. The values of the resulting keys may be placed into the corresponding positions of the result vector 422.

In some embodiments, the result vector 422 may have an associated data structure (not shown) into which the left and right table data (which may be indices) associated with each key may be placed. Any of the matrices and/or vectors illustrated may be stored in corresponding dedicated buffers and/or combined in aggregated buffers.

Figure 5:
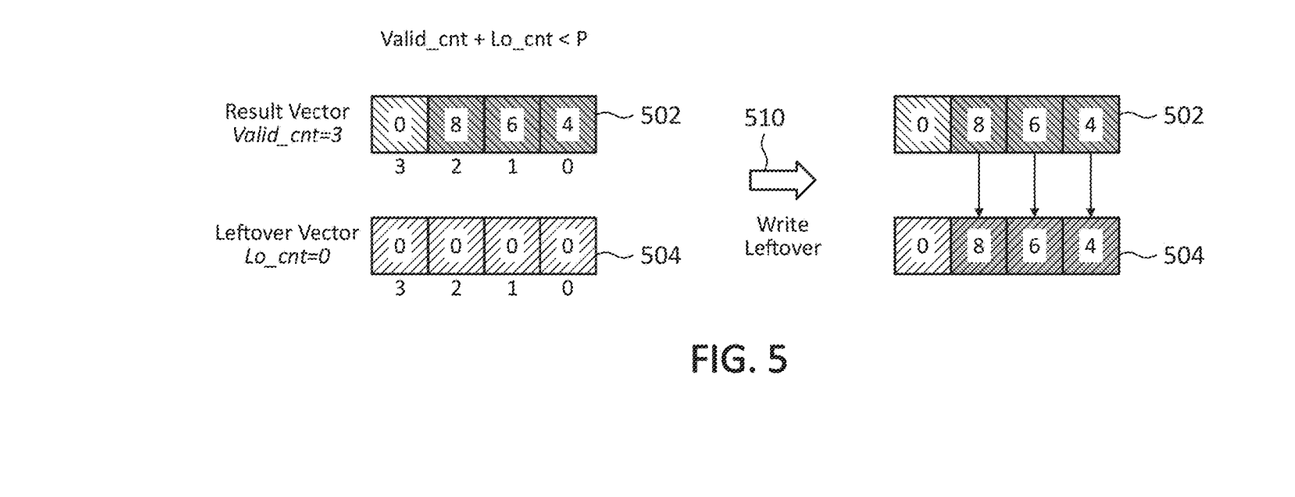
FIGS. 5 and 6 illustrates first and second example embodiments of output gather operations according to this disclosure.
Figure 6:
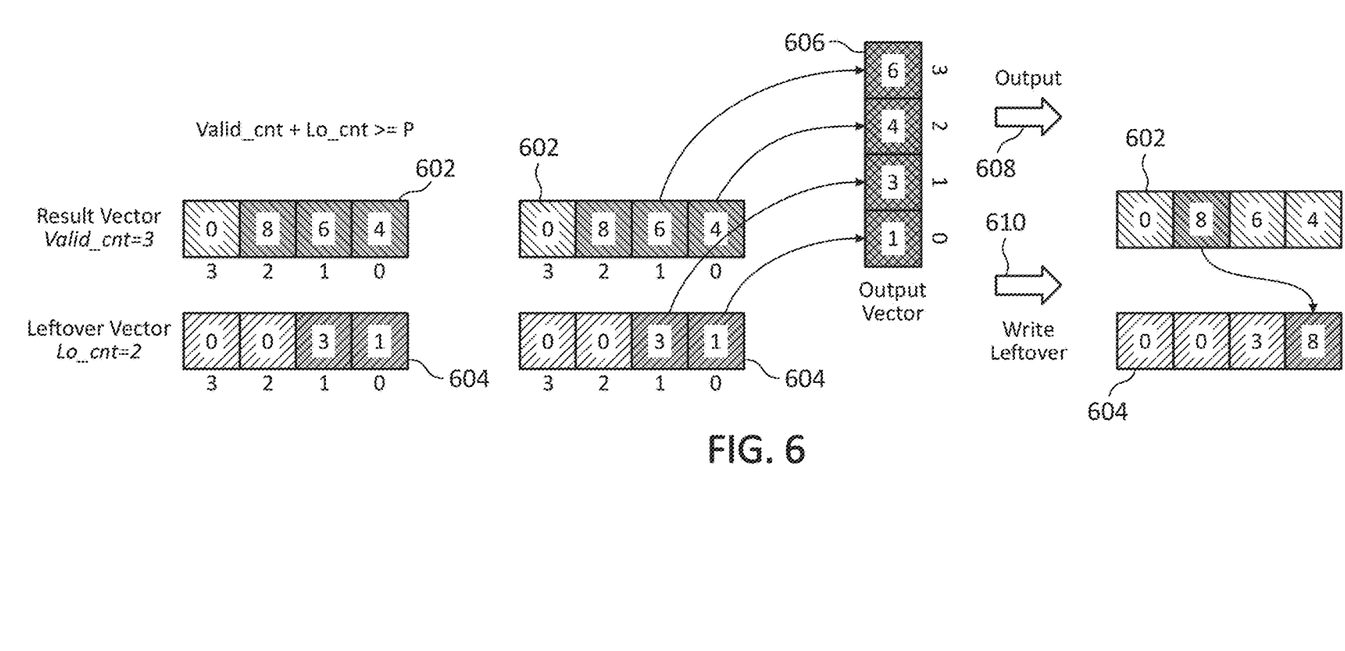

FIGS. 5 and 6 illustrate first and second example embodiments of output gather operations according to this disclosure. The embodiments illustrated in FIGS. 5 and 6 may be implemented, for example, with the embodiment illustrated in FIG. 2. The embodiments illustrated in FIGS. 5 and 6 may be used, for example, to continue processing the results generated by the embodiment illustrated in FIG. 4.

In some embodiments, with the collected result vector 422, the results may be packed into a compact vector (which may be referred to as a one-dimensional array), in which all of the positions may be filled (unless the merge join process is finished, in which case there may be no more results to include in the result vector 422) so the results may be output (e.g., written to memory or streamed to a subsequent operation). In some embodiments, a leftover buffer may be used to gather results and, depending on the implementation details, reduce or eliminate dependency issues. The embodiments illustrated in FIGS. 5 and 6 may compute how many valid elements may result from combining the result vector from a result collection operation with the contents of a current leftover vector in the leftover buffer. If the combined result is large enough to fill an output vector, the results may be combined in the output vector and output from the gathering process. Any remaining elements from the result array may be written into a leftover vector in a leftover buffer.

FIG. 5 illustrates an embodiment in which Valid_cnt+lo_cnt<P, where Valid_cnt may indicate the number of valid entries in a result vector 502 received by the output gather operation from a result collection operation such as result collection operation 403 illustrated in FIG. 4, lo_cnt may indicate the number of entries in a leftover vector 504, and P may indicate a parallel factor, which in this embodiment, may be P=4.

As illustrated in FIG. 5, the result vector 502 may have the key values 4, 6, and 8, at positions 0, 1, and 2, respectively (Valid_cnt=3). The leftover vector 504 may initially be empty (lo_cnt=0). Thus, there may not be enough values in the result vector 502 to fill the leftover vector 504. The contents of the result vector 502 may then be written into the leftover vector as shown by arrow 510, and the output gather operation may be concluded until the next cycle.

FIG. 6 illustrates an embodiment in which Valid_cnt+lo_cnt≥P. Specifically, the result vector 602 may have the key values 4, 6, and 8, at positions 0, 1, and 2, respectively (Valid_cnt=3), and the leftover vector 604 may have the key values 1 and 3 at positions 0 and 1, respectively (lo_cnt=2).

Thus, there may be enough keys in the result vector 602 to fill the leftover vector 604 and still have leftover values, so a batch of output results may be output from the output gather operation. Specifically, the key values 1 and 3 at positions 1 and 0, respectively, of the leftover vector 604 may be moved into positions 0 and 1 of an output vector 606 which may leave the leftover vector 604 empty. The key values 4 and 6 at positions 0 and 1, respectively, of the result vector 602 may be written into positions 2 and 3, respectively of output vector 606. The output vector 606 may then be output by the output gather operation (e.g., written to memory or streamed to a subsequent operation) as shown by arrow 608.

The remaining key value 8 in position 2 of the result vector 602 may then be written into position 0 of the leftover vector 604 as shown by arrow 610, and the output gather operation may be concluded until the next cycle.

In some embodiments, the output vector 606 may have an associated data structure (not shown) into which the left and right table data (which may be indices) associated with each key may be placed similar to the embodiment illustrated in FIG. 4.

In the embodiments illustrated in FIGS. 5 and 6, the leftover vector may be indicated with hatching that runs downward to the left, the result vector may be indicated with hatching that runs downward to the right, and the output vector may be indicated with cross hatching. Valid data may be indicated by shaded cells, and invalid or null data may be indicated by unshaded cells. In the embodiments illustrated in FIGS. 5 and 6, any of the vectors may be stored in corresponding dedicated buffers and/or combined in aggregated buffers.

Figure 7:
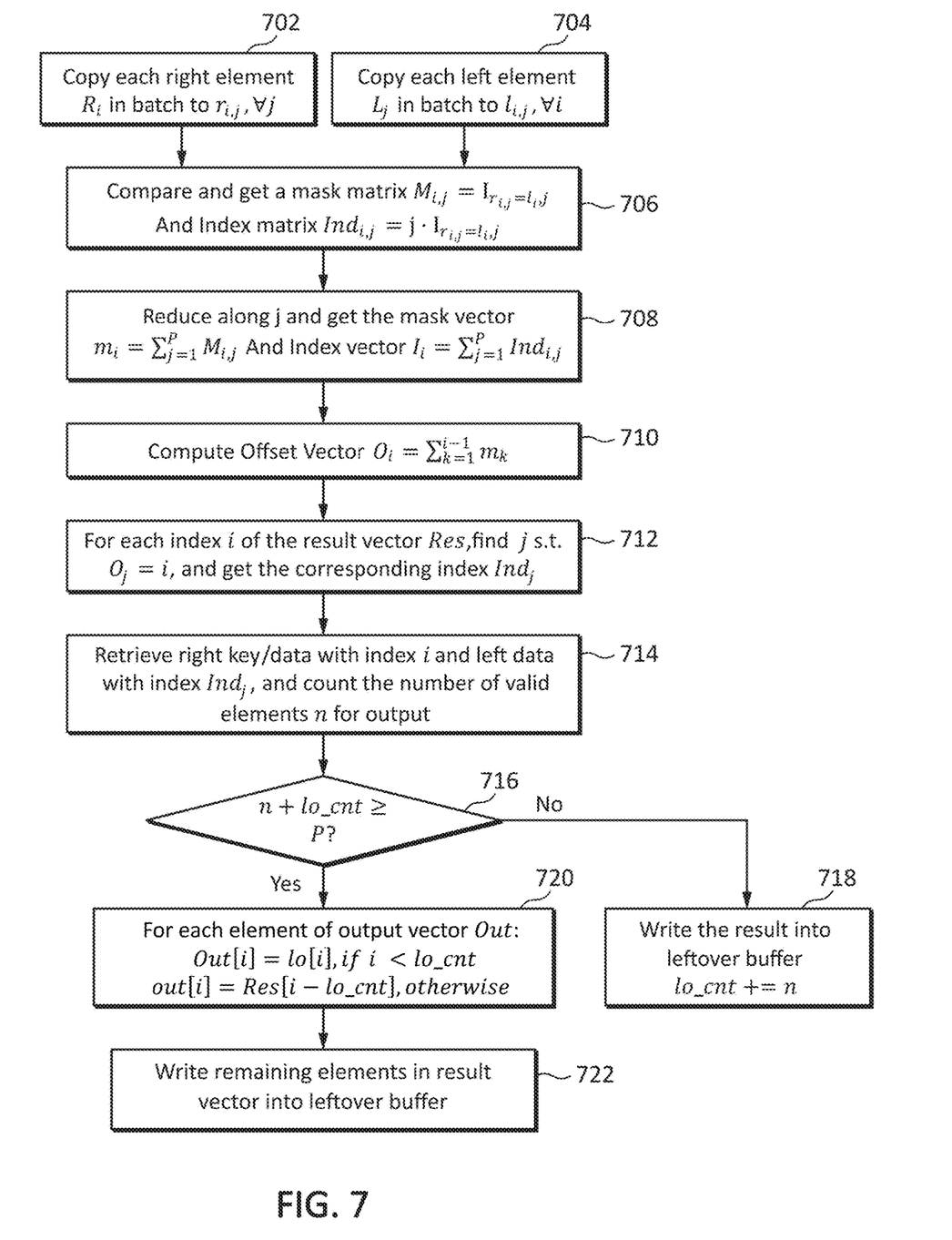
FIG. 7 illustrates a flow chart of an example embodiment of a merge join method having parallel comparison, result collection, and output gather operations according to this disclosure.

FIG. 7 illustrates a flow chart of an example embodiment of a merge join method having parallel comparison, result collection, and output gather operations according to this disclosure. In the embodiment illustrated in FIG. 7, the batches of right and left data may have been loaded into dedicated registers H and L, respectively. At operations 702 and 704, each element of the batches of right and left data may be copied into an intermediate data structure to perform a parallel comparison operation. At operation 706, the parallel comparison may be performed to generate a mask matrix $M_{i,j}$ and an index matrix index $Ind_{i,j}$. At operation 708, the mask matrix $M_{i,j}$ and index matrix $Ind_{i,j}$ may be reduced to generate the mask vector $m_i$ and index vector $l_i$. At operation 710, an offset vector $O_i$ may be generated from the mask vector $m_i$. At operation 712, the results may be collected in a result vector Res based on the corresponding indices in the index vector $Ind_i$. At operation 714, the right keys and corresponding right data (which may be indices) and corresponding left data may be retrieved, and the number of valid elements n for the output may be counted. At operation 716, if the amount of data in the result vector Res is not enough to fill the leftover buffer, the data in the result vector Res is written into the leftover buffer at operation 718, and the method may conclude until the next cycle. However, if at operation 716 the amount of data in the result vector Res is enough to fill the leftover buffer, the method proceeds to operation 720 where the data in the leftover buffer are combined with enough of the data in the lower positions of the result buffer Res to fill an output vector Out which is then output, for example, by writing to memory. Any data remaining in the result buffer Res may be written into the leftover buffer at operation 722, and the method may conclude until the next cycle.

Near-Storage Implementation

Although the principles disclosed herein are not limited to any particular applications, in some embodiments, the techniques may be especially beneficial when applied to near-storage data processing. For example, a computational storage device such as a solid state drive (SSD) having an accelerator device such as an FPGA may provide a high level of parallelism and/or efficiency which may improve the performance of a merge join operation according to this disclosure.

Figure 8:
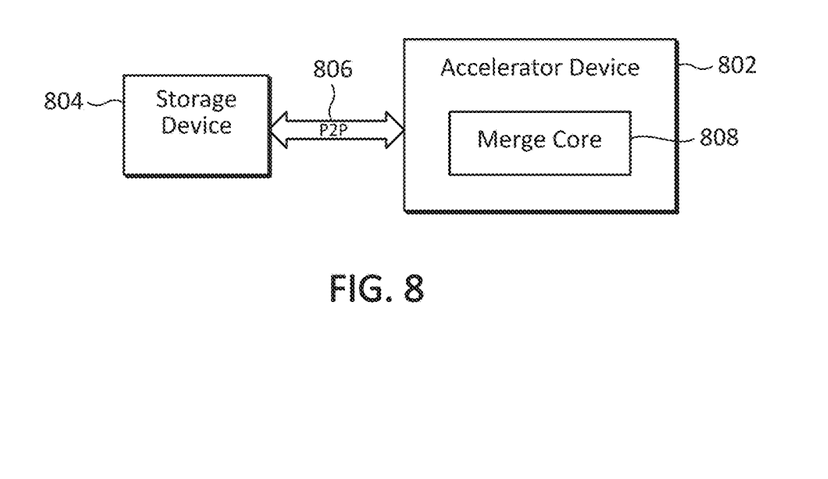
FIG. 8 illustrates an embodiment of a near-storage processing system according to this disclosure.

FIG. 8 illustrates an embodiment of a near-storage processing system according to this disclosure. The embodiment illustrated in FIG. 8 may include an accelerator device 802 and a storage device 804 which may be connected through a P2P connection 806. The accelerator device 802 may include a merge core 808 which may implement any of the parallel processing schemes disclosed herein, including a parallel comparison, result collection, and output gathering process.

The storage device may be implemented with any type of storage apparatus including SSDs, hard disk drives (HDDs), optical drives, drives based on any type of persistent memory such as cross-gridded nonvolatile memory with bulk resistance change, and/or the like, and/or any combination thereof. The accelerator 802 and merge core 808 may be implemented with hardware, software, or any combination thereof including combinational logic, sequential logic, one or more timers, counters, registers, state machines, CPLDs FPGAs, ASICs. CISC processors and/or RISC processors, and/or the like executing instructions stored in volatile memories such as DRAM and/or SRAM, nonvolatile memory such as flash memory, and/or the like, as well as GPUs, NPUs, and/or the like.

The P2P connection 806 may be implemented with any type of connection including an interconnect such as Peripheral Component Interconnect Express (PCIe), Compute Express Link (CXL), Advanced eXtensible Interface (AXI), and/or the like, a storage connection and/or protocol such as Serial ATA (SATA), Serial Attached SCSI (SAS), Non-Volatile Memory Express (NVMe), and/or the like, a network connection and/or protocol such as Ethernet, Fibre Channel, InfiniBand, and/or the like, as well as combinations thereof such as NVMe over Fabric (NVMe-oF), and/or the like.

The embodiment illustrated in FIG. 8 may be implemented in any form or configuration, for example, a storage device having a form factor such as 3.5 inch, 2.5 inch, 1.8 inch, M.2, and/or the like, and/or using any connector configuration such as SATA, SAS, U.2, and/or the like. As another example, the embodiment illustrated in FIG. 8 may be implemented entirely or partially as an add-in card such as a half-height or full-height PCIe add-in card. Some embodiments may be implemented entirely or partially with and/or within a server chassis, server rack, data room, datacenter, edge datacenter, mobile edge datacenter, and/or any combinations thereof, and/or the like.

Figure 9:
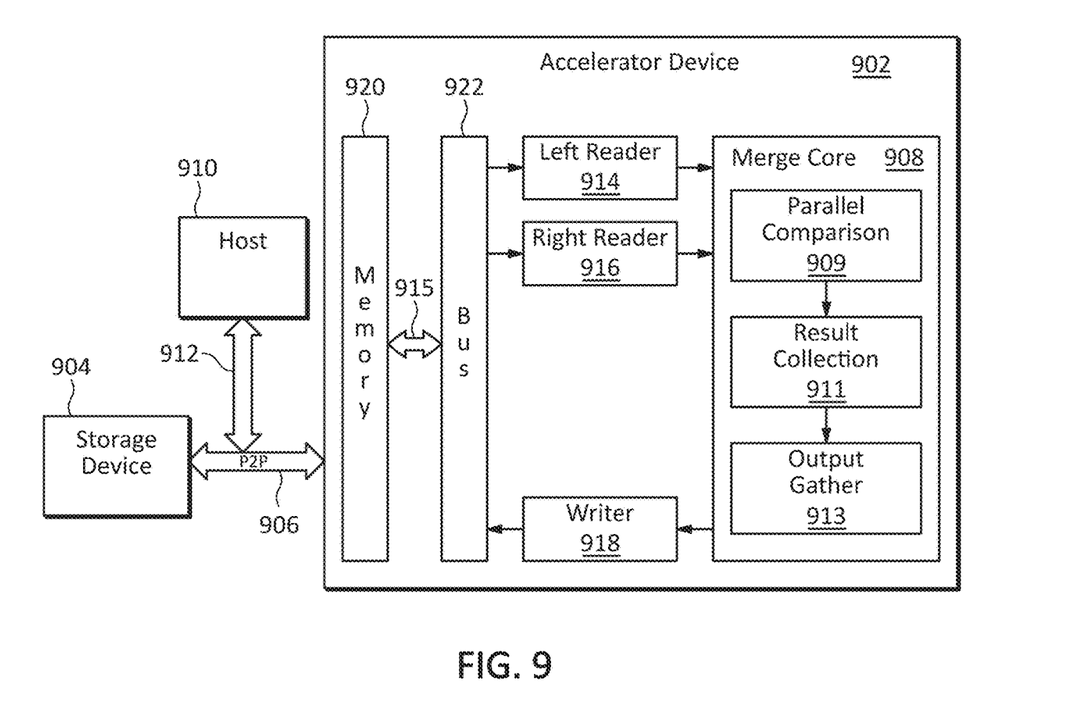
FIG. 9 illustrates an example embodiment of a near-storage processing system according to this disclosure.

FIG. 9 illustrates an example embodiment of a near-storage processing system according to this disclosure. The embodiment illustrated in FIG. 9 may be used, for example, to implement the embodiment illustrated in FIG. 8 and thus, may be implemented, for example, using any of the implementation details described above.

The embodiment illustrated in FIG. 9 may include an accelerator device 902 and a storage device 904 which may be connected through a P2P connection 906. A host 910 may be connected to the accelerator 902 and/or the storage device 904 through a connection 912.

The accelerator device 902 may include a merge core 908 which may implement any of the parallel processing schemes disclosed herein, including a parallel comparison, result collection, and output gathering process. Thus, the merge core 908 may include a parallel comparison circuit 909, a result collection circuit 911, and an output gather circuit 913. The accelerator device 902 may further include a left reader 914, a right reader 916, and a writer 918 which may be interfaced to a memory 920 through a bus 922.

In some embodiments, the architecture illustrated in FIG. 9 may be used for accelerating merge join operations. For example, the accelerator device 902 may directly read a dataset having left and right tables from the storage device 904 into the memory 920 using the P2P connection 906. The first reader 914 may read keys and corresponding data (which may be, e.g., indices) from a left table in the memory 920, and the second reader 916 may read keys and corresponding data (which may be, e.g., indices) from a right table in the memory 920. The merge core 908 may perform a merge join operation on the left and right tables to generate a resulting joined table that may be written to the memory 920 by the writer 918. In some embodiments, the readers 914 and 916 and writer 918 may implement streaming interfaces.

In some embodiments, the architecture illustrated in FIG. 9 may be implemented as a template-based configuration, for example, to fit different memory width and/or data type configurations. In some embodiments, read and/or write requests may be packed into bit widths that may fully utilize the width of the memory interface 915. The separate readers 914 and 916 may operate in parallel to read each table and/or unpack the elements based on the configured parallelism and feed them into the input streams to the merge core 908. The merge core 908 may be configured to conduct the parallel comparison, result collection and output gathering process with a bit width (e.g., parallel factor P) that may compare a certain number of pairs of keys each cycle (e.g., 16 pairs of keys per cycle for P=4). The writer module 918 may be configured to pack the results into bit widths that may fully utilize the width of the memory interface.

Figure 10:
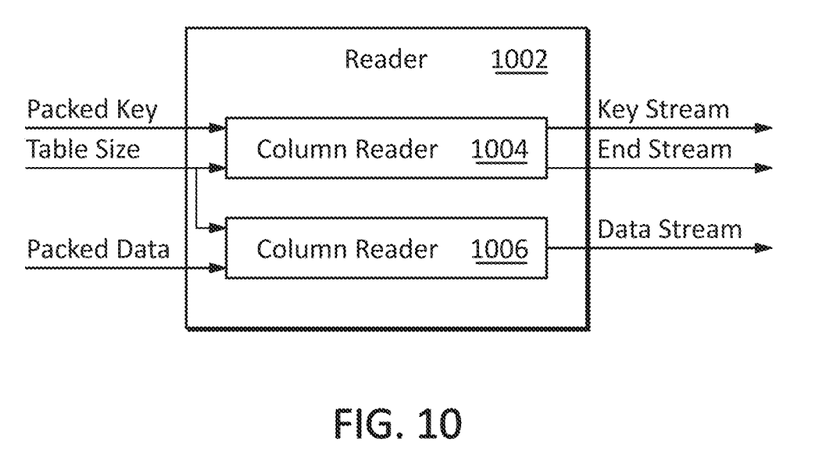
FIG. 10 illustrates an example embodiment of a reader according to this disclosure.

FIG. 10 illustrates an example embodiment of a reader according to this disclosure. The embodiment illustrated in FIG. 10 may be used, for example, to implement any of the readers 914 and 916 illustrated in FIG. 9. The embodiment 1002 illustrated in FIG. 10 may include first column reader 1004 arranged to convert packed keys to a key stream, and a second column reader 1006 arranged to convert packed data associated with the keys to a data stream. In some embodiments, the packed data and data stream may be indices to other data. A table size input may inform the column readers 1004 and 1006 how much data to read, and an end stream output may indicate when the key stream has finished.

Figure 11:
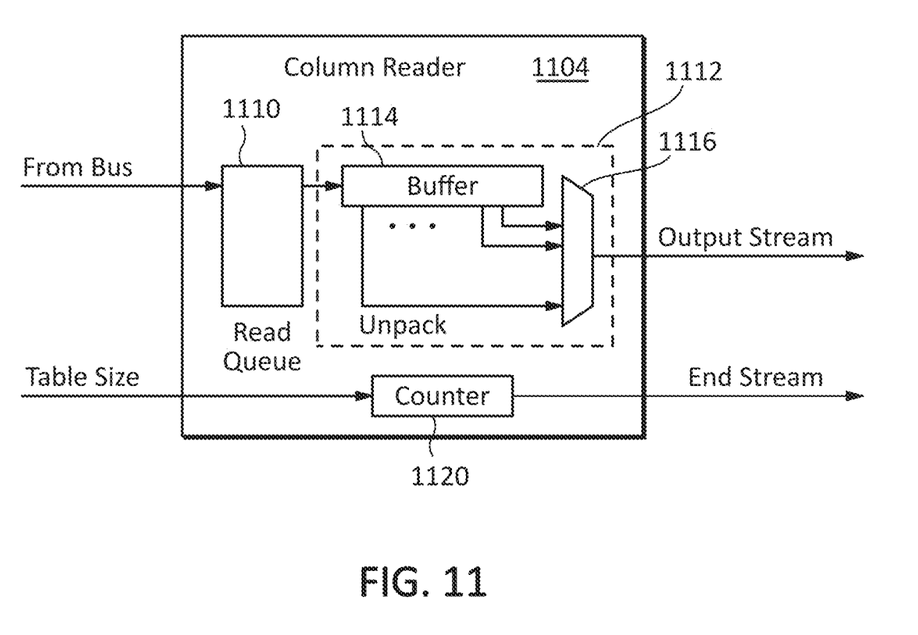
FIG. 11 illustrates an example embodiment of a column reader according to this disclosure.

FIG. 11 illustrates an example embodiment of a column reader according to this disclosure. The embodiment illustrated in FIG. 11 may be used, for example, to implement any of the column readers 1004 and 1006 illustrated in FIG. 10. The embodiment 1104 illustrated in FIG. 11 may include a read queue 1110 that may receive data from memory, for example, at the width of the bus 922 illustrated in FIG. 9. Data from the read queue 1110 may be transferred to an unpack module 1112 which may load the data into a buffer 1114 having a width, for example, of an interface to the memory 920 illustrated in FIG. 9. A serializer 1116 may convert the data from buffer 1114 into an output stream. A counter 1120 may use the table size data to generate the end stream signal.

Figure 12:
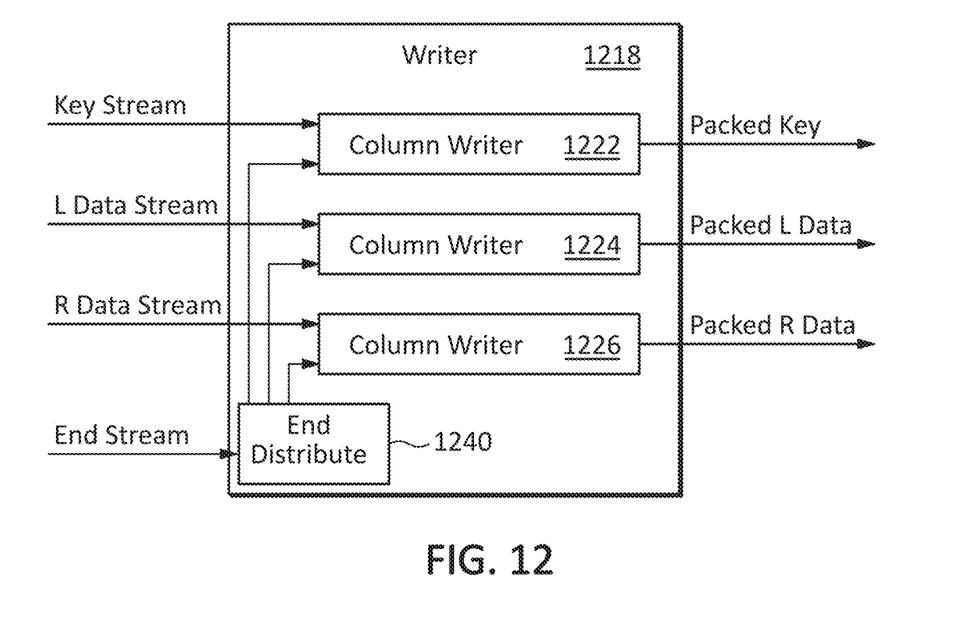
FIG. 12 illustrates an example embodiment of a writer according to this disclosure.

FIG. 12 illustrates an example embodiment of a writer according to this disclosure. The embodiment illustrated in FIG. 12 may be used, for example, to implement the writer 918 illustrated in FIG. 9. The embodiment 1218 illustrated in FIG. 12 may include a first column writer 1222 to convert a key stream into packed keys, a second column writer 1224 to convert a left data stream into packed left data, and a third column writer 1226 to convert a right data stream into packed right data. An end distribute circuit 1240 may distribute the end stream signal to the three column writers.

Figure 13:
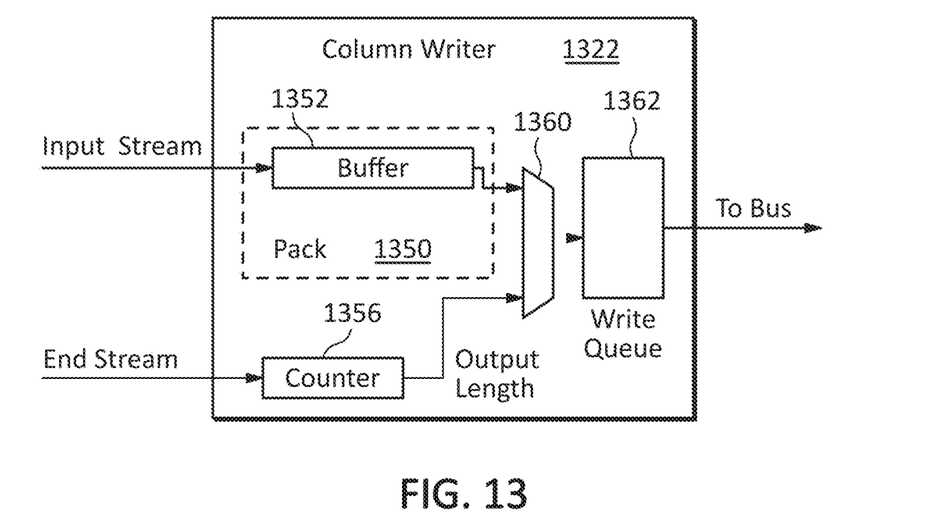
FIG. 13 illustrates an example embodiment of a column writer according to this disclosure.

FIG. 13 illustrates an example embodiment of a column writer according to this disclosure. The embodiment illustrated in FIG. 13 may be used, for example, to implement any of the column writers 1222, 1224, or 1226 illustrated in FIG. 12. The embodiment 1322 illustrated in FIG. 13 may include a packing circuit 1350 having a packing buffer 1352 which may have a width, for example, of an interface to the memory 920 illustrated in FIG. 9. A counter 1356 may generate an output length signal based on the end stream signal. A deserializer 1360 may convert the data from the packing buffer 1352 into packed data that may be stored in a write queue 1362 before being written to the memory 920 through the bus 922 illustrated in FIG. 9.

Figure 14:
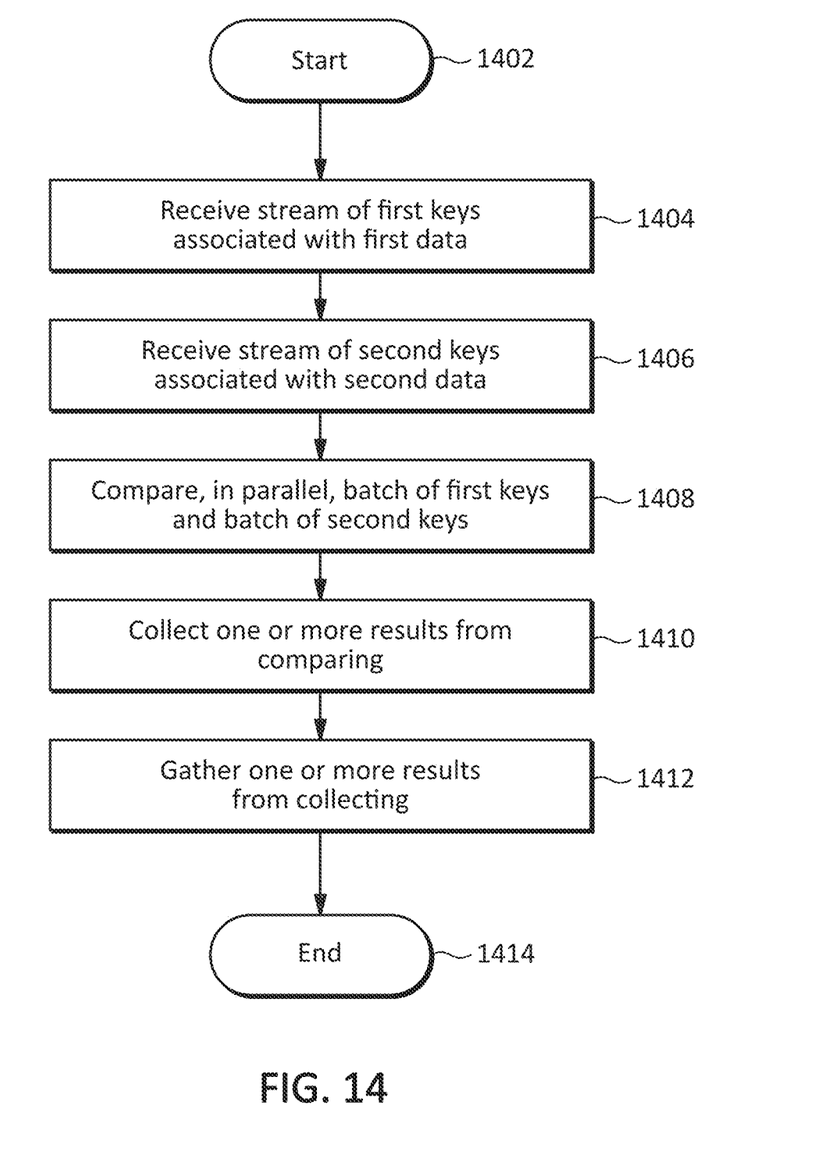
FIG. 14 illustrates an embodiment of a method of processing data according to this disclosure.

FIG. 14 illustrates an embodiment of a method of processing data according to this disclosure. The embodiment illustrated in FIG. 14 may begin at operation 1402. At operation 1404, the method may receive a stream of first keys associated with first data. At operation 1406, the method may receive a stream of second keys associated with second data. At operation 1408, the method may compare, in parallel, a batch of the first keys and a batch of the second keys. At operation 1410, the method may collect one or more results from the comparing. At operation 1412, the method may gather one or more results from the collecting. The method may end at operation 1414.

The operations and/or components described with respect to the embodiment illustrated in FIGS. 14, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied.

In some embodiments, and depending on the implementation details, the embodiments disclosed herein may implement any number of the following features and/or provide any number of the following benefits.

The flexibility of the architecture may enable some embodiments to take advantage of other resources in a query pipeline. For example, in some database query pipelines, a sort operation may have already been performed on the left and/or right tables. Thus, an embodiment according to this disclosure may be well suited to perform a merge join operation on the sorted data.

The parallel processing of merge-join operations according to this disclosure may be more compute and/or energy efficient than operations on a scalar-based CPU architecture.

This technique disclosed herein may be generalized to optimize any other data intensive operations. Thus, a parallel comparison operation may be implemented with any type of parallel data processing, and a compare-collect-gather mechanism according to this disclosure may be implemented on any parallel architecture design with streaming dataflow.

The techniques disclosed herein may provide scalability to different batch sizes of data with little or no timing overhead, and thus, may not affect pipeline scheduling.

The techniques disclosed herein may be partially or fully pipelined with little or no backpressure, and may be able to scale up with little or no impact on the clock frequency.

The techniques disclosed herein may be integrated into the acceleration framework of a computational storage device and flexibly cooperate with other modules.

The techniques disclosed herein may accommodate arbitrary data lengths and/or data types at compile-time, and/or a set of data type at run-time.

The techniques disclosed herein may utilize a compare-gather scheme to provide scalability to different batch sizes with little or no timing overhead.

The techniques disclosed herein may fully utilize a memory bus width, for example, with the data packing/unpacking scheme.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, step, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, based on" may refer to "based at least in part on." In some embodiments, "disabled" may refer to "disabled at least in part." A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of processing data, the method comprising:
   loading, using a first register, at least one first key associated with first data;
   loading, using a second register, at least one second key associated with second data;
   comparing, based on a join key, the at least one first key and the at least one second key to generate a first result, wherein the join key is derived from the at least one first key, and wherein the first result comprises an index matrix, the index matrix comprising an indicator of the at least one first key corresponding to the at least one second key;
   storing, using a buffer, the first result;
   collecting the first result and a second result to generate a first collected result; and
   gathering the first collected result and a second collected result.

2. The method of claim 1, wherein the comparing comprises generating at least one matrix based on the at least one first key and the at least one second key.

3. The method of claim 2, wherein the collecting the first result comprises reducing the at least one matrix.

4. The method of claim 3, wherein the at least one matrix comprises the index matrix and a mask matrix, and reducing the at least one matrix comprises:
   reducing the index matrix to an index vector; and
   reducing the mask matrix to a mask vector.

5. The method of claim 4, further comprising generating an offset vector based on the mask vector.

6. The method of claim 1, wherein the collecting the first result and the second result comprises generating a result vector based on an offset and the at least one first key.

7. The method of claim 1, wherein the gathering the first collected result and a second collected result comprises storing, in a leftover vector, the first collected result.

8. The method of claim 7, wherein the gathering the first collected result and a second collected result further comprises combining at least a portion of the leftover vector from a first cycle with at least a portion of a leftover vector from a second cycle.

9. The method of claim 1, wherein the first data comprises at least one index to at least one row associated with the at least one first key.

10. The method of claim 1, wherein the comparing, the collecting, and the gathering perform a merge join operation.

11. An apparatus comprising a merge core comprising:
a parallel comparison circuit comprising at least one processor configured to:
receive a stream of first keys associated with first data;
receive a stream of second keys associated with second data;
compare, based on a join key, at least one of the first keys and at least one of the second keys to generate a first result, wherein the join key is derived from one of the first keys, and wherein the first result comprises an index matrix, the index matrix comprising an indicator of the first keys corresponding to the second keys; and
a collection circuit configured to collect one or more results from the parallel comparison circuit; and
a gathering circuit configured to gather one or more results from the collection circuit.

12. The apparatus of claim 11, further comprising:
a first reader configured to read the stream of first keys from a memory; and
a second reader configured to read the stream of second keys from the memory.

13. The apparatus of claim 12, wherein:
the first reader is further configured to read a stream of the first data from the memory; and
the second reader is further configured to read a stream of the second data from the memory.

14. The apparatus of claim 13, further comprising a writer configured to write a stream of output keys from the gathering circuit to the memory.

15. The apparatus of claim 14, wherein:
the first reader is further configured to read a stream of the first data from the memory;
the second reader is further configured to read a stream of the second data from memory; and
the writer is further configured to write a stream of output data associated with the stream of output keys from the gathering circuit to the memory.

16. The apparatus of claim 11, wherein the parallel comparison circuit, the collection circuit, and the gathering circuit are integral with an accelerator device.

17. The apparatus of claim 16, wherein the accelerator device comprises a field programmable gate array.

18. A system comprising:
a storage device;
a memory configured to receive a dataset from the storage device; and
an accelerator device coupled to the storage device, wherein the accelerator device comprises:
a parallel comparison circuit configured to receive a stream of first keys associated with first data of the dataset from the memory, receive a stream of second keys associated with second data of the dataset from the memory, and compare, in parallel, using a join key, at least one of the first keys and at least one of the second keys to generate a first result, wherein the join key is derived from one of the first keys, and wherein the first result comprises an index matrix, the index matrix comprising an indicator of the first keys corresponding to the second keys;
a collection circuit configured to collect one or more results from the parallel comparison circuit; and
a gathering circuit configured to gather one or more results from the collection circuit.

19. The system of claim 18, further comprising a point-to-point connection between the storage device and the accelerator device.

20. The system of claim 19, wherein the memory and the accelerator device are integral with the storage device.

* * * * *